M. L. SENDERLING.
TWIN CONNECTING ROD.
APPLICATION FILED JULY 26, 1915.

1,186,341. Patented June 6, 1916.

WITNESSES

INVENTOR
Martin L. Senderling
BY
ATTORNEYS

UNITED STATES PATENT OFFICE.

MARTIN L. SENDERLING, OF JERSEY CITY, NEW JERSEY.

TWIN CONNECTING-ROD.

1,186,341.  Specification of Letters Patent.  Patented June 6, 1916.

Application filed July 26, 1915. Serial No. 41,962.

*To all whom it may concern:*

Be it known that I, MARTIN L. SENDERLING, a citizen of the United States, and a resident of Jersey City, in the county of Hudson and State of New Jersey, have invented a new and Improved Twin Connecting-Rod, of which the following is a full, clear, and exact description.

Among the principal objects which the present invention has in view are: to provide a rod of the character mentioned, having a plurality of full length bearing members for equalizing the strain and wear on the crank pin of an engine; to provide a split bearing having directly opposed equal bearing members grouped about a crank pin to equalize the thrust strain thereon; to provide means for operatively uniting connecting rods in paired relation and alined; and to provide a bearing member which may be replaced or repaired.

Figure 1:
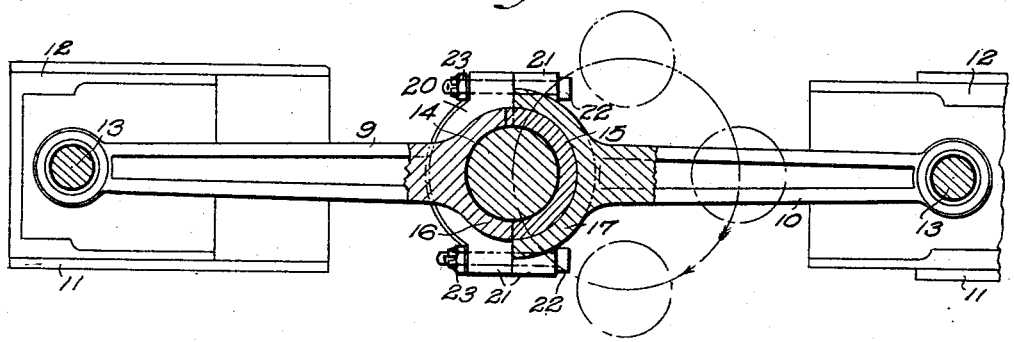
Figure 2:
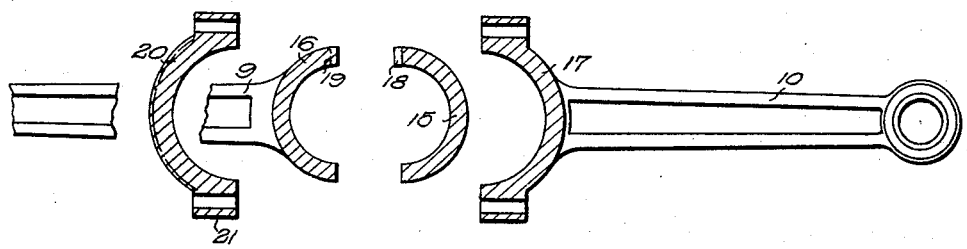
Figure 3:
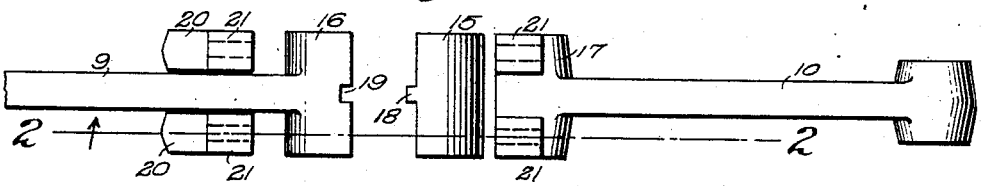
Figure 4:
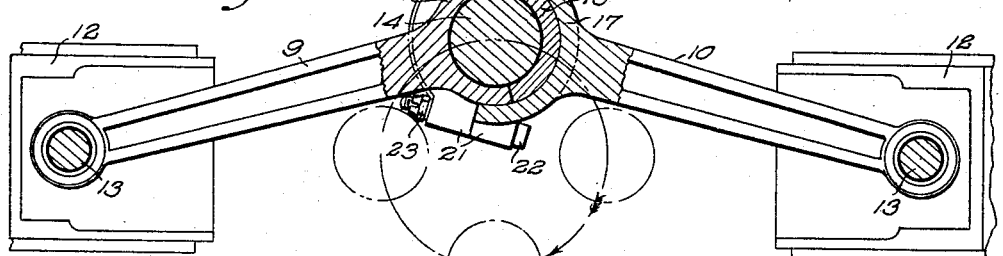
Figure 5:
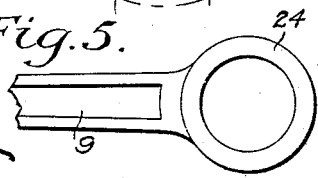

*Drawings.*—Figure 1 is a side view partly in section, showing a twin connecting rod constructed and arranged in accordance with the present invention; Fig. 2 is a sectional view, taken as on the line 2—2 in Fig. 3; Fig. 3 is a top view, showing the members forming the twin connecting rod, said members being dissociated to show the independent construction of the parts thereof; and Fig. 4 is a view similar to Fig. 1, showing the operating position of the members of the twin rod when on the power and compression strokes thereof. Fig. 5 is a side view of the end of one of the connecting rods, shown as constructed in accordance with the modified form of the invention.

*Description.*—As seen in the drawings, the rods 9 and 10 are installed in an engine employing opposed cylinders 11 and pistons 12 therefor. Through the skirt of each of the pistons is a wrist pin 13 to which the said connecting rods are joined in conventional manner. The rods 9 and 10 are mounted in the same plane and each has a full half thrust bearing on a crank pin 14. The bearing yoke 16 for the rod 9 is preferably formed integral therewith. The bearing for the rod 10 consists in a semi-cylindrical insert 15.

The insert 15 forms two bearings, one internal for the crank pin 14, the other external for the yoke 17 of the rod 10. The yokes 16 and 17 and the insert 15 are each semi-cylindrical, and of equal length. The yoke 16 and the insert 15 are held in line by a key 18 formed in the said insert to register with and fill the groove 19 in the yoke 16, as is best shown in Fig. 3 of the drawings. The yokes 16 and 17 and insert 15 are held on the crank pin 14 and in grouped relation by the caps 20, which are rigidly united to the yoke 17.

The insert 15 and yoke 16 are machined to form a cylinder, the wall of which is equal throughout. The combined insert and yoke 15 and 16 form an internal complete bearing for the crank pin 14 and an external partially complete bearing for the yoke 17 and the caps 20. The external bearing formed by the insert 15 comprises the entire external surface of the said insert. The external bearing of the yoke 16 is limited to the path of the yoke 17, where it passes the joints formed by the said insert and yoke and where the caps 20 rest at each side of the rod 9. Or in other words, with this modification, it will be understood that the yoke 16 forms a full half internal and a full half external bearing for the yoke 17 and caps 20. The caps 20 and the yoke 17 are provided with bolting bosses 21. The bosses 21 are perforated to receive the bolts 22. When the nuts 23 are tightened on the bolts 22, the caps 20 are drawn upon the yoke 17 to tighten the bearings on the yoke 16 and insert 15.

While there has been herein described, the structure embodying the insert 15 and yokes 16 and 17, as machined surface members, it will be understood that Babbitt facings may be imparted to the said members by any of the conventional and approved methods. As the babbitt wears, the wear may be taken up by tightening the nuts 23, as in conventional bearings wherein Babbitt seats are employed.

It will be understood that in engines of the opposed type where twin connecting rods are employed, the power stroke is always a thrust and the bearing of each of the connecting rods in the present construction is transferred to the crank pin 14 by a full half bearing. The strain which is exerted on the caps 20 and bolts 22 is only that imparted by the pin 14 when moving one of the pistons 12 on what is known as the suction stroke of the engine. The strain incident to this action is unappreciable and easily taken by the bolts 22. In Figs. 1 and 4 of the drawings, the path of the center of the pin 14 is shown by broken lines and in Fig. 4, the direction of movement of the same is indicated by an arrow. Also by broken lines, the three positions of the crank pin are indicated in conjunction with the full line showing of the pin.

In the modified form of the invention shown in Fig. 5 of the drawings, the head of the connecting rod 9 is an unbroken cylinder 24, which is used as a substitute for the insert 15 and yoke 16. It will be understood that when using this form of bearing for the rod 9, the crank pin 14 is driven through the crank arms and the cylindrical bearing 24. The rod 10, yoke 17 and caps 20 therefor are constructed in the manner above described, as when using the insert 15 and the yoke 16.

Claims:

1. A connecting rod coupling as characterized comprising a plurality of rods for operating in the same plane and for connecting a plurality of pistons with a single crank pin in said plane, said rods having semi-cylindrical bearing yokes of relatively different diameters; and a full length bearing insert for the yoke having the larger diameter, said insert corresponding in thickness with the wall of the yoke having the smaller diameter.

2. A connecting rod coupling as characterized comprising a plurality of rods for operating in the same plane and for connecting a plurality of pistons with a single crank pin in said plane, said rods having semi-cylindrical bearing yokes of relatively different diameters; a full length bearing insert for the yoke having the larger diameter, said insert corresponding in thickness with the wall of the yoke having the smaller diameter; and means for holding said insert in operative relation to said yokes.

3. A connecting rod coupling as characterized comprising a plurality of rods for operating in the same plane and for connecting a plurality of pistons with a single crank pin in said plane, said rods having semi-cylindrical bearing yokes of relatively different diameters; a full length bearing insert for the yoke having the larger diameter, said insert corresponding in thickness with the wall of the yoke having the smaller diameter; and means for alining said insert and said yokes.

4. A connecting rod coupling as characterized comprising a plurality of rods for operating in the same plane and for connecting a plurality of pistons with a single crank pin in said plane, said rods having semi-cylindrical bearing yokes of relatively different diameters; a full length bearing insert for the yoke having the larger diameter, said insert corresponding in thickness with the wall of the yoke having the smaller diameter; and means for operatively connecting said yokes in bearing relation.

5. A connecting rod coupling as characterized comprising a plurality of rods for operating in the same plane and for connecting a plurality of pistons with a single crank pin in said plane, said rods having semi-cylindrical bearing yokes of relatively different diameters; a full length bearing insert for the yoke having the larger diameter, said insert corresponding in thickness with the wall of the yoke having the smaller diameter; and a plurality of caps rigidly connected with the larger of said yokes for holding the smaller of said yokes in operative relation to said crank pin.

6. A connecting rod coupling as characterized comprising a plurality of rods for operating in the same plane and for connecting a plurality of pistons with a single crank pin in said plane, said rods having semi-cylindrical bearing yokes of relatively different diameters; a full length bearing insert for the yoke having the larger diameter, said insert corresponding in thickness with the wall of the yoke having the smaller diameter; and a plurality of half caps rigidly connected with the larger of said yokes, said caps infolding the smaller of said yokes to form bearings therefor.

7. A twin connecting rod joint comprising two rods, each rod having a semi-cylindrical end, said ends being of different radii, each of said ends having complementary parts forming an annular head of cylindrical outline, one of said rods forming such annular heads providing an annular bearing adapted for embracing the journal of a crank pin, and on its outer face having a portion of annular form providing a journal for the inner portion of the other of said rods by which a full bearing is obtained for each such rod equal to the full length of the crank pin journal.

8. In combination, a power-translating mechanism embodying a crank having a crank pin and a plurality of reciprocating pistons disposed in pairs, the members of each pair being at opposite sides of said crank, the axes of said pistons and the pivotal center of said crank being in substantially the same plane; two connecting rods uniting said pistons and said crank pin, said rods being pivotally united to swing in the same plane, one of said rods having a full length semi-circular bearing on said crank pin; and a full length semi-circular insert interposed between said pin and the other connecting rod, said insert forming bearings for said pin and said other rod.

In witness whereof I have signed my name to this specification in the presence of two subscribing witnesses.

MARTIN L. SENDERLING.

Witnesses:
E. F. MURDOCK,
PHILIP D. ROLLHAUS.